July 3, 1973  F. L. SWILLINGER  3,743,495
APPARATUS FOR PRODUCING FLOAT GLASS
Filed April 12, 1971
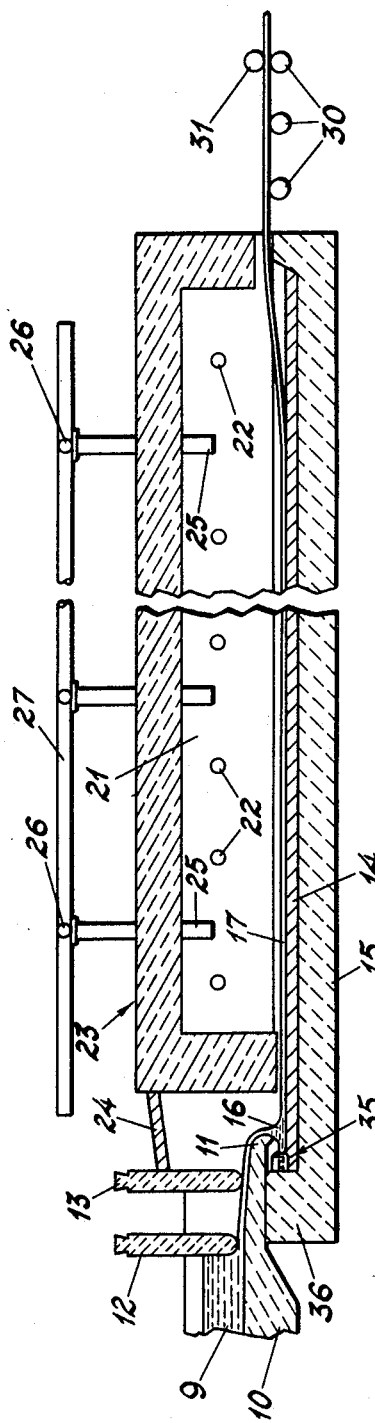
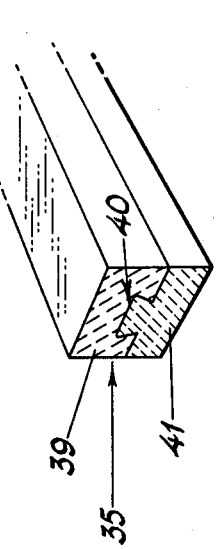
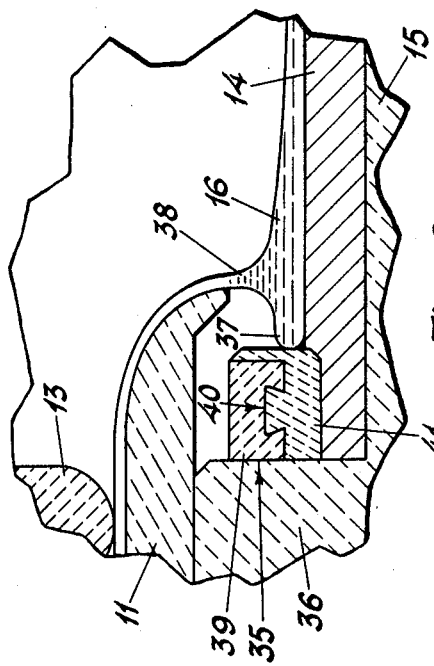
INVENTOR.
Francis L. Swillinger
BY
Collins & Oberlin
ATTORNEYS

United States Patent Office 3,743,495
Patented July 3, 1973

---

3,743,495
APPARATUS FOR PRODUCING FLOAT GLASS
Francis L. Swillinger, Perrysburg, Ohio, assignor to Libbey-Owens-Ford Company, Toledo, Ohio
Continuation-in-part of abandoned application Ser. No. 743,205, July 8, 1968. This application Apr. 12, 1971, Ser. No. 133,394
Int. Cl. C03b 19/02
U.S. Cl. 65—182 R            4 Claims

ABSTRACT OF THE DISCLOSURE

This invention pertains to treatment of a buoyant body of molten glass at the entrance end of a float glass forming apparatus, and involves the use of a spacer tile provided with a glass contacting surface that will not stick to the molten glass.

---

The application is a continuation-in-part of application Ser. No. 743,205, filed July 8, 1968 now abandoned.

BACKGROUND OF THE INVENTION

Field of the invention

The present invention relates broadly to the production of float glass and more particularly to the treatment of the buoyant body of molten glass from which the float glass ribbon develops and to an improved form of wet back element for contact therewith.

Description of the prior art

A conventional form of float glass forming apparatus is illustrated and described in United States Patent No. 3,083,551, granted Apr. 2, 1963 and, as there explained, the manufacture of flat glass by the float process involves delivering glass at a controlled rate onto a bath of molten metal and advancing it along the surface of the bath within a "float atmosphere" and under physical and thermal conditions which assure (1) that a buoyant body of molten glass will be established on the bath, (2) that the glass in said body will flow laterally unhindered to develop on the surface of the bath a buoyant layer of molten glass of stable thickness, and (3) that said buoyant layer will be continuously advanced in the form of a ribbon, along the bath and sufficiently cooled as it advances to permit it to be taken unharmed out of the bath by mechanical conveying means.

Patent No. 3,083,551 further explains that the body of molten glass may be established on the bath of molten metal by flowing molten glass over the lip of a relatively narrow spout, extending over and vertically spaced from the surface of the metal bath so that the molten glass has a free fall of a few inches to the bath; that the height of fall and location of the spout is such as to ensure a "heel" being formed on and behind the buoyant glass body; and that this heel extends rearwardly under the spout to the end wall of the bath tank, wetting the end wall and acting to protect the surface of the bath under the spout against access thereto of outside air.

However in actual practice with such an arrangement, the desired lateral glass flow in the buoyant body is not always attained and the molten glass has been found to stick to the end wall of the bath tank, and so create a stagnant area in the buoyant body of molten glass which has proved to be one source of serious float glass defects, including that known as open bottom bubbles, in the finished glass.

SUMMARY

According to the present invention, the problem of open bottom bubles is substantially reduced, if not entirely eliminated, and the float operation generally improved by interposing a special spacer or wet back tile between the end wall of the float bath tank and the heel of the buoyant body of molten glass and, preferably, by providing a glass contacting surface on said tile to which the molten glass will not stick.

BRIEF DESCRIPTION OF THE DRAWINGS

In the drawings, wherein like numerals refer to like parts throughout:

FIG. 1 is a longitudinal, vertical sectional view through a float glass forming apparatus provided with the wet back tile of the invention;

FIG. 2 is an enlarged, fragmentary view of the spout, tank wall and wet back tile assembly of FIG. 1;

FIG. 3 is a fragmentary, perspective view of the one embodiment of the wet back tile of the invention; and FIG. 4 is a view similar to FIG. 3, showing a more elaborate form of wet back tile.

DESCRIPTION OF THE PREFERRED EMBODIMENTS

Referring now more particularly to the drawings, there is illustrated in FIG. 1 a typical float glass apparatus which is generally similar to the one disclosed in U.S. Patent No. 3,083,551. In this apparatus molten glass 9 is supplied from a forehearth 10 to a spout 11 in an amount regulated and controlled by a tweel 12 and a gate 13.

The stream of molten glass flowing through the spout 11 falls freely onto a bath of molten metal 14, contained in a tank 15, and forms a buoyant body of molten glass 16 from which a buoyant layer of stable thickness 17 develops and floats over and toward the discharge end of the float bath tank as a continuous ribbon.

The molten bath 14 (which may be of molten tin) in the tank 15, and the head space 21 over the bath, are heated by radiant heat directed downwardly from heaters 22 and a roof structure 23 encloses the head space to provide a float chamber which, with extension 24, makes it possible to maintain a volume of protecting gas over the parts of the bath 11 that are exposed at the sides of the glass ribbon in the chamber. The roof structure 23 is provided at intervals with ducts 25 connected by branches 26 to headers 27 through which a protecting gas (such as a mixture of nitrogen and hydrogen) is fed into the head space 21 under sufficient pressure to create a plenum therein. The protecting gas is one which will not react chemically with the tin to produce contaminants for the glass and the plenum condition prevents the entrance of atmospheric air into the float chamber.

By careful temperature control, the ribbon of glass 17 is progressively cooled as it floats on the bath 14 so that, by the time it reaches the discharge end of the apparatus it has stiffened sufficiently to permit its transfer to a lehr on mechanical conveying means such as the supporting rolls 30 mounted outside of the tank 15. The ribbon 17 is advanced along the bath 14 by the tractive effort of the supporting rolls 30 and, if desired, of a superimposed roll 31, any or all of which rolls can be driven at speeds calculated to produce the desired ultimate thickness in the ribbon.

The float glass apparatus as just described is generally similar to those now in commercial use but, according to the invention, has its operation notably improved by the provision of a refractory tile 35 positioned in and transversely of the tank 15 between the end wall 36 thereof and the heel 37 of the buoyant body of molten glass 16 established on the bath 14 by the freely falling stream of glass 38.

The tile 35 thus acts to space the heel 37 of the buoyant body 16 forwardly from the end wall 36 to the tank 15 a distance equal to the width of the tile and, since the tile rather than the furnace wall is then contacted by the glass in the heel 37, it also acts as a "wet back" tile and, as such, has distinct advantages which will be more fully hereinafter described.

However, in installing such a spacer or wet back tile, particularly as a replacement, the bottom of the tile may be wet with glass during launching so that when the new tile is in operative position it can have a glass covered surface at an area of the buoyant body 16 that is recognized as being stagnant and that has been found to be a source of open bottom bubbles. To prevent any such stagnating tendency, in a preferred embodiment of the invention the lower part of the tile 35 is made of a material, such as carbon or graphite, to which the glass will not stick and, where desired, the covering of carbon or the like can also be extended over the front face of the tile.

Due to their very low specific gravity relative to molten glass and tin, conventional materials non-adherent to molten glass such as carbon generally and its specific form graphite, exhibit a strong tendency to float within the metal bath of a float glass apparatus. Even conventional refractories, which have a considerably higher density than the non-adherent materials, tend to float in molten tin. For this reason, they must normally be anchored to the bath structure in some manner. Carbon or graphite is rather fragile so that anchoring relatively large sections for immersion into the dense liquid without causing structural failure is difficult. The spacer tile of the present invention, for example, may be on the order of four or five feet in length.

This difficulty is overcome by the novel composite member of the invention wherein the more dense refractory spacer tile has a covering which does not stick to molten glass on a glass contacting surface thereof. As is well-known, such refractories have a considerably greater density or specific gravity than non-adhering materials such as carbon conventionally used in float baths. For example, the carbon may have a density of about 100 pounds per cubic foot and the refractory a density of about 135 pounds per cubic foot. The refractory, in addition to being more dense than the non-adhering material, also has greater durability and strength so that the composite member can be supported or held down, as the case may be, in conventional fashion. The refractory portion is of sufficient height above the level of the molten glass layer so that it forces the non-adhering covering beneath the glass and into the molten metal. The unit is held in position by the usual spacer tile supports and there is no need to anchor the fragile non-adhering material to the bath structure as would be necessary with a spacer tile made entirely of this material.

As best shown in FIG. 3, the top portion 39 of the wet back tile 35 of the invention may, for example, be of any refractory material suitable for use in a "float atmosphere" and dove tail cut as at 40 to receive a matching lower portion 41 of carbon which covers its bottom surface. Similarly, the carbon bottom portion can be generally L shaped, as shown at 42 in FIGS. 2 and 4 to provide a front face covering 43 as well as a bottom covering of carbon for the tile 35.

The so-called "wet back action" which takes place in a properly designed and adjusted float glass apparatus is an extremely important one and, when the wet back element is correctly spaced rearwardly from the spout lip, involves wetting of the wet back element by the glass in the buoyant body of glass being deposited on the tin bath and the setting up of a sort of spiral flow of molten glass laterally along the wet back element, which spiral flow carries any devitrified glass formed in the heel area toward the sides of the buoyant body.

However, with prior float glass structures, in which the wet back element was the end wall of the bath tank, whenever the tank wall was not correctly spaced from the spout lip, a satisfactory wet back action was not obtained and, as a consequence, devitrified glass formed and remained in the middle area of the buoyant body of glass and ultimately appeared as "dog" in the middle and critical area of the float ribbon.

Moreover, even where the end wall-spout spacing was correct in an original installation designed for glass of one composition, a satisfactory wet back action was not obtained when the apparatus was subsequently used to produce float glass of a different composition. For example, to obtain a satisfactory wet back action when producing a high iron, heat absorbing type glass has been found to require a spacing approximately ½ of that required in obtaining a similar action while producing regular glass. Consequently an established tank wall to spout lip spacing that was satisfactory for the one was unsuitable for the other and "on the fly" adjustment between the lip of the spout, leading from the glass furnace, and the float bath tank was of course impracticable.

With the wet back tile of this invention, however, an exact spacing of the wet back from the spout lip can be had, and any desired change of spacing can be readily effected, without seriously affecting the continuous operation of the furnace, by simply launching a tile of the desired width and/or by replacing an existing tile with a tile of a different width.

At the same time, when the tile 35 of the invention, as launched, is provided with a glass contacting surface to which the molten glass will not stick, a troublesome source of open bottom bubbles is eliminated and the float glass operation is notably improved.

It will be obvious that the body of the tile 35 may be of any refractory material suitable for use under float glass conditions and that similarly suitable materials other than carbonaceous materials, such as boron nitride, that will not stick to molten glass can be employed as a facing or covering therefor.

Indeed it is to be understood that the forms of the invention herein shown and described are to be taken as illustrative embodiments only of the same, and that various changes in the shape, size and arrangement of parts, as well as various procedural changes may be resorted to without departing from the spirit of the invention as defined in the following claims.

I claim:

1. In apparatus for producing float glass including a tank containing a bath of molten metal and having a rear end wall, means for establishing a buoyant body of molten glass on said bath spaced forwardly from said rear wall and having a rearwardly extending heel, a refractory spacer tile interposed between said rear wall of said tank and said buoyant body of molten glass positioned relative to said buoyant body to be contacted by the glass and said heel thereof, and means securing said tile in position between said rear wall and said buoyant body, the improvement comprising a covering of a material that will not stick to molten glass on the bottom of said refractory tile, said refractory tile having a density greater than that of said covering material whereby said covering is depressed through said buoyant body of molten glass into said molten metal by the weight of the composite tile and covering.

2. In apparatus for producing float glass including a tank containing a bath of molten metal and having a rear end wall, means for establishing a buoyant body of molten glass on said bath spaced forwardly from said rear wall and having a rearwardly extending heel, a refractory spacer tile interposed between said rear wall of said tank and said buoyant body of molten glass positioned relative to said buoyant body to be contacted by the glass in said heel thereof, and means securing said tile in said position between said rear wall and said buoyant body, the improvement comprising a covering of a material that will not stick to molten glass on a glass contacting surface of said refractory tile, said covering including a layer of carbon on the bottom and on the form face thereof, said refractory tile having a density greater than that of said covering material whereby said covering is depressed through said buoyant body of molten glass into said molten metal by the weight of the composite tile and covering.

3. In apparatus for producing float glass including a tank containing a bath of molten metal and having a rear end wall, means for establishing a buoyant body of molten glass on said bath spaced forwardly from said rear wall and having a rearwardly extending heel, a refractory spacer tile interposed between said rear wall of said tank and said buoyant body of molten glass positioned relative to said buoyant body to be contacted by the glass in said heel thereof, and means securing said tile in said position between said rear wall and said buoyant body, the improvement comprising a covering of a material that will not stick to molten glass on a glass contacting surface of said refractory tile, said tile being provided with an upper portion of a refractory material with a bottom portion of carbon secured together by a dovetail joint, and said refractory tile having a density greater than that of said covering material whereby said covering is depressed through said buoyant body of molten glass into said molten metal by the weight of the composite tile and covering.

4. Apparatus as defined in claim 3 in which said bottom portion is generally L shaped in cross section and the leg of the L covers the adjoining front face of said upper portion.

References Cited
UNITED STATES PATENTS

| | | | |
|---|---|---|---|
| 3,351,452 | 11/1967 | Robinson | 65—99 A |
| 3,331,672 | 7/1967 | Javaux | 65—99 A |
| 1,410,729 | 3/1922 | Balz | 52—598 |

ROBERT L. LINDSAY, Primary Examiner